United States Patent
Yang et al.

(10) Patent No.: US 11,863,214 B2
(45) Date of Patent: Jan. 2, 2024

(54) ANTENNA SWITCHING CIRCUIT AND TERMINAL

(71) Applicant: VIVO MOBILE COMMUNICATION CO., LTD., Guangdong (CN)

(72) Inventors: Yonghua Yang, Guangdong (CN); Jiawei Zheng, Guangdong (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 83 days.

(21) Appl. No.: 17/677,668

(22) Filed: Feb. 22, 2022

(65) Prior Publication Data

US 2022/0182082 A1 Jun. 9, 2022

Related U.S. Application Data

(63) Continuation of application No. PCT/CN2020/111379, filed on Aug. 26, 2020.

(30) Foreign Application Priority Data

Aug. 27, 2019 (CN) .......................... 201910797002.0

(51) Int. Cl.
*H04B 1/00* (2006.01)
*H04B 1/401* (2015.01)
*H04B 7/0404* (2017.01)

(52) U.S. Cl.
CPC ........... *H04B 1/0064* (2013.01); *H04B 1/401* (2013.01); *H04B 7/0404* (2013.01)

(58) Field of Classification Search
CPC ..... H04B 1/0064; H04B 1/401; H04B 7/0404
See application file for complete search history.

(56) References Cited

U.S. PATENT DOCUMENTS 10,608,678 B1* 3/2020 Hormis ................. H04B 1/401
2014/0105079 A1 4/2014 Bengtsson et al.
(Continued)

FOREIGN PATENT DOCUMENTS

CN 103856255 A 6/2014
CN 105098318 A 11/2015
(Continued)

OTHER PUBLICATIONS

The First Office Action of Priority Application No. CN 201910797002.0 issued by the Chinese Patent Office dated Nov. 2, 2020.
(Continued)

*Primary Examiner* — Nguyen T Vo
(74) *Attorney, Agent, or Firm* — IP & T GROUP LLP

(57) ABSTRACT

An antenna switching circuit includes: a first switching circuit and a second switching circuit. The first switching circuit is electrically connected with at least two first radio frequency paths and at least two first antennas, respectively. In a first state, one of the first radio frequency paths is connected with one of the first antennas, and an operating band of one of the first radio frequency path is a first frequency band; the second switching circuit is electrically connected with at least two second radio frequency paths and at least two second antennas, respectively. In a second state, one of the second radio frequency paths is connected with one of the second antennas, and an operating band of one of the second radio frequency band is a second frequency band. The first frequency band is lower than the second frequency band.

12 Claims, 1 Drawing Sheet

(56) References Cited

U.S. PATENT DOCUMENTS

2019/0074601 A1* 3/2019 Kim .................... H04B 1/0064
2021/0218158 A1* 7/2021 Kim ........................ H01Q 1/38

FOREIGN PATENT DOCUMENTS

| CN | 105306112 A | 2/2016 |
| CN | 106209154 A | 12/2016 |
| CN | 106788577 A | 5/2017 |
| CN | 107124191 A | 9/2017 |
| CN | 109474291 A | 3/2019 |
| CN | 110545112 A | 12/2019 |

OTHER PUBLICATIONS

The Second Office Action of Priority Application No. CN 201910797002.0 issued by the Chinese Patent Office dated May 7, 2021.
International Search Report and Written Opinion of International Application No. PCT/CN2020/111379 issued by the Chinese Patent Office dated Nov. 18, 2020.

* cited by examiner

ANTENNA SWITCHING CIRCUIT AND TERMINAL

CROSS REFERENCE TO RELATED APPLICATIONS

This application is a Bypass Continuation Application of PCT/CN2020/111379 filed on Aug. 26, 2020, which claims priority to Chinese Patent Application No. 201910797002.0 filed on Aug. 27, 2019, which are incorporated herein by reference in their entirety.

TECHNICAL FIELD

The present disclosure relates to the field of electronic technologies, and in particular, to an antenna switching circuit and a terminal.

BACKGROUND

An antenna form of a terminal has evolved from no switching to two-antenna switching, and two-antenna switching technologies have been applied widely. When an antenna at the top and an antenna at the bottom cannot meet the needs of a certain scene, a third antenna or more antennas will be introduced to meet application needs. For example, when playing games in landscape mode of a terminal, a user will hold both ends of the terminal with two hands, which will obviously affect the performance of antennas at both ends. However, in this case, the performance of an antenna at a side edge will not be affected by hand-holding or will be affected slightly. Therefore, switch to an antenna at the side edge will meet communication requirements when the user plays games in landscape mode.

SUMMARY

Embodiments of the present disclosure provide an antenna switching circuit and a terminal.

According to a first aspect, an embodiment of the present disclosure provides an antenna switching circuit, including:
  a first switching circuit, where the first switching circuit is electrically connected with at least two first radio frequency paths and at least two first antennas, respectively, and the first switching circuit includes at least one first state, in a first state, one of the first radio frequency paths is connected with one of the first antennas, and an operating band of the first radio frequency path is a first frequency band; and
  a second switching circuit, where the second switching circuit is electrically connected with at least two second radio frequency paths and at least two second antennas, respectively, and the second switching circuit includes at least one second state, in a second state, one of the second radio frequency paths is connected with one of the second antennas, and an operating band of the second radio frequency band is a second frequency band, where the first frequency band is lower than the second frequency band.

According to a second aspect, an embodiment of the present disclosure provides a terminal, including the foregoing antenna switching circuit.

DETAILED DESCRIPTION OF EMBODIMENTS

The technical solutions in the embodiments of the present disclosure are described below clearly with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

At present, a network state of playing games in landscape mode is one of key complaints, which can be effectively solved by four-antenna switching. A new switch needs to be introduced to the four-antenna switching. At present, according to switching rules of a four-antenna switching algorithm, a selected radio frequency frame is as follows:
  first, double pole double throw (DPTP) switch is combined with three pole three throw (3P3T) switch; or
  second, only four pole four throw (4P4T) switch is used.

However, parameters for 4P4T switch industry have not met application requirements. In addition, according to switch architecture, an insertion loss of 4P4T switch is similar to that of 3P3T switch and DPDT switch, and a path insertion loss will be greater than that of 3P3T switch. However, if two 3P3T switches are used to build architecture, lines will be extremely complicated, which will lead to a serious increase in wiring loss and device insertion loss.

Figure 1:
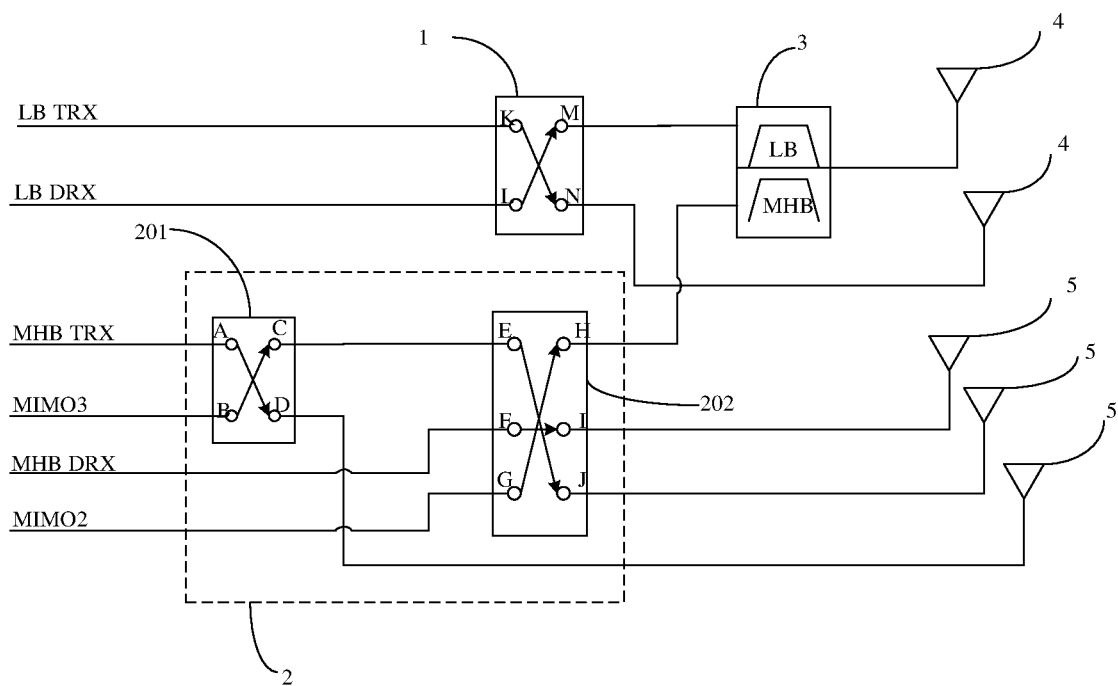
FIG. 1 is one of schematic circuit diagrams of an antenna switching circuit according to an embodiment of the present disclosure.
Figure 2:
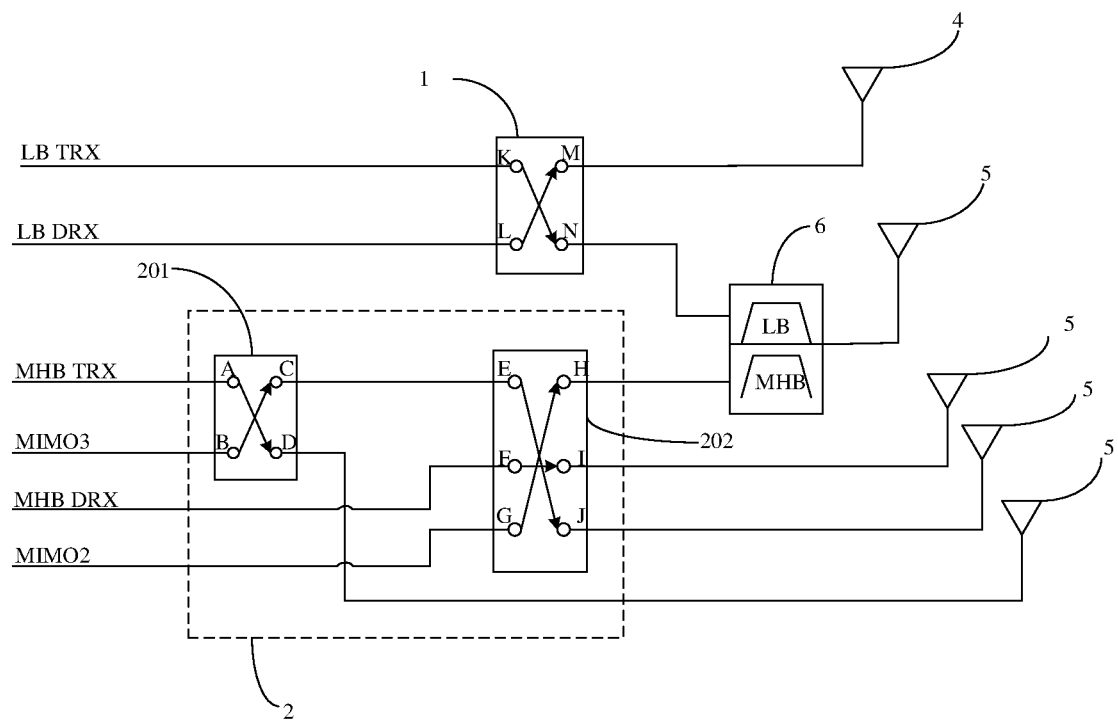
FIG. 2 is the other of the schematic circuit diagrams of the antenna switching circuit according to an embodiment of the present disclosure.

Embodiments of the present disclosure provide an antenna switching circuit. As shown in FIG. 1 and FIG. 2, the antenna switching circuit includes:
  a first switching circuit, where the first switching circuit is electrically connected with at least two first radio frequency paths and at least two first antennas 4, respectively, and the first switching circuit includes at least one first state, in a first state, one of the first radio frequency paths is connected with one of the first antennas 4, and an operating band of the first radio frequency path is a first frequency band; and
  a second switching circuit 2, where the second switching circuit 2 is electrically connected with at least two second radio frequency paths and at least two second antennas 5, respectively, and the second switching circuit 2 includes at least one second state, in a second state, one of the second radio frequency paths is connected with one of the second antennas 5, and an operating band of the second radio frequency band is a second frequency band, where the first frequency band is lower than the second frequency band, that is, all frequency points of the first frequency band are smaller than a minimum frequency point of the second frequency band. Alternatively, the first frequency band is a 4G frequency band, and the second frequency band is a SUB 6G frequency band. In other words, the first frequency band is 698 MHz-960 MHz, and the second frequency band is 1710 MHz-5000 MHz. Alternatively, the first frequency band is 960 MHz-1710 MHz (including 1710 MHz), and the second frequency band is 1710 MHz-5000 MHz (excluding 1710 MHz).

Operating frequency points of any two of the at least two first radio frequency paths are different, and operating frequency points of any two of the at least two second radio frequency paths are different.

In addition, the first switching circuit is configured to conduct a path between any of the at least two first radio frequency paths and any of the at least two first antennas 4, and the second switching circuit 2 is configured to conduct a path between any of the at least two second radio frequency paths and any of the at least two second antennas 5.

Therefore, according to this embodiment of the present disclosure, if a path between a first antenna 4 and a first radio frequency path operating in a low frequency band and a path between a second antenna 5 and a second radio frequency path operating in a high frequency band are split, the first radio frequency path and the second radio frequency path will not be combined at a front end, thus reducing an insertion loss caused by a combiner. Furthermore, paths between the first radio frequency path and the second radio frequency path operating in different frequency bands and the antenna are split, so that lines of the antenna switching circuit is simpler.

Alternatively, the first switching circuit includes:
a first control switch 1, where the first control switch 1 includes two first input terminals, two first output terminals, and a first connection switch. The first connection switch can switch a connection state between any of the two first input terminals and any of the two first output terminals. The two first input terminals are respectively electrically connected with two of the first radio frequency paths in one-to-one correspondence. The two first output terminals are respectively electrically connected with two of the first antennas 4 in one-to-one correspondence.

As shown in FIG. 1, the first control switch 1 is a DPTP switch. The first control switch 1 can conduct a path between any of two of the first radio frequency paths and any of two of the first antennas 4. Alternatively, if a first radio frequency channel may operate at a low band (LB), switching between two antennas at a low frequency band may be implemented through the first control switch 1.

Alternatively, the second switching circuit 2 includes:
a second control switch 201, where the second control switch 201 includes two second input terminals, two second output terminals, and a second connection switch, where the second connection switch can switch a connection state between any of the two second input terminals and any of the two second output terminals; and
a third control switch 202, where the third control switch 202 includes three third input terminals, three third output terminals, and a third connection switch, where the third connection switch can switch a connection state between any of the three third input terminals and any of the three third output terminals.

The two second input terminals and two first target input terminals are electrically connected with four of the second radio frequency paths in one-to-one correspondence. A first target output terminal and the three third output terminals are electrically connected with four of the second antennas 5 in one-to-one correspondence, and a second target output terminal is electrically connected with a second target input terminal.

The second target input terminal is one of the three third input terminals, and the first target input terminal is one of the three third input terminals except the second target input terminal.

The first target output terminal is one of the two second output terminals, and the second target output terminal is the other of the two second output terminals.

As shown in FIG. 2, a second control switch 201 is a DPDT switch, and a third control switch 202 is a 3P3T switch. The second control switch 201 and the third control switch 202 cooperate with each other to conduct a path between any of four of the second radio frequency paths and any of four of the second antennas 5. Alternatively, a second radio frequency path may operate in a medium-high band (MHB). Therefore, four-antenna switching in the medium-high band may be implemented through the cooperation of the second control switch 201 and the third control switch 202.

Alternatively, as shown in FIG. 1, the antenna switching circuit further includes:
a first combiner 3, where the first combiner 3 includes a fourth input terminal, a fifth input terminal, and a fourth output terminal. The fourth input terminal is electrically connected with the first switching circuit. The fourth output terminal is electrically connected with a first target antenna. The first target antenna is one of the at least two first antennas 4. The fifth input terminal is electrically connected with the second switching circuit 2.

The second switching circuit 2 further includes a third state. In the third state, one of the at least two second radio frequency paths is connected with the first target antenna.

The combiner is configured to combine input multi-band signals and output them together. Alternatively, as shown in FIG. 1, the first combiner 3 combines input signals in LB and MHB, and then is connected with a first antenna 4 by a feeder, which not only saves one feeder and reduces the number of second antennas 5, but also avoids switching between different antennas. Alternatively, when a path between a first radio frequency path operating in a first frequency band and the first antenna 4 connected with the first combiner 3 is conducted, the first antenna 4 operates in the first frequency band; when a path between a second radio frequency path operating in a second frequency band and the first antenna 4 connected with the first combiner 3 is conducted, the first antenna 4 operates in the second frequency band, that is, the first combiner 3 may be directly controlled to output a signal in the first frequency band or a signal in the second frequency band, so that one antenna may operate in different frequency bands, avoiding switching between different antennas when signals in different frequency bands need to be transmitted.

Alternatively, the antenna switching circuit further includes:
a second combiner 6, where the second combiner 6 includes a sixth input terminal, a seventh input terminal, and a fifth output terminal. The sixth input terminal is electrically connected with the first switching circuit. The fifth output terminal is electrically connected with a second target antenna. The second target antenna is one of the at least two second antennas 5. The seventh input terminal is electrically connected with the second switching circuit 2.

The first switching circuit further includes a fourth state. In the fourth state, one of the at least two first radio frequency paths is connected with the second target antenna.

The combiner may further be disposed between the second antenna 5 and the second radio frequency path. For example, as shown in FIG. 2, the second combiner 6 combines input signals in LB and MHB, and then is connected with a second antenna 5 by a feeder, which not only saves one feeder and reduces the number of first antennas 4, but also avoids switching between different antennas. Alternatively, when a path between a first radio frequency path operating in a first frequency band and a second antenna 5 connected with the second combiner 6 is conducted, the second antenna 5 operates in the first frequency band; when a path between a second radio frequency path operating in a second frequency band and the second antenna 5 connected with the second combiner 6 is conducted, the second antenna 5 operates in the second frequency band, that is, the second combiner 6 may be directly controlled to output a signal in the first frequency band or a signal in the second frequency band, so that one antenna may operate in different frequency bands, avoiding switching between different antennas when signals in different frequency bands need to be transmitted.

Alternatively, the two first input terminals are electrically connected with a first terminal and a second terminal, respectively. The first terminal is a common terminal for primary transmitting and receiving of one of the first radio frequency paths, and the second terminal is a diversity receiving terminal of one of the first radio frequency paths.

Alternatively, because the first radio frequency path may operate in a LB, two terminals electrically connected with the first control switch 1 may be a low band transceiver (LB TRX) and a low band discontinuous reception (LB DRX).

In addition, for example, as shown in FIG. 1, a first port K and a second port L form two first input terminals of the first control switch 1, and a third port M and a fourth port N form two first output terminals of the first control switch 1. When the first port K is electrically connected with the third port M, a path between LB TRX and the first combiner 3 or the first antenna 4 electrically connected with the first combiner 3 is conducted. When the second port L is electrically connected with the fourth port N, a path between LB DRX and the first antenna 4 is conducted. When the first port K is electrically connected with the fourth port N, a path between LB TRX and the first antenna 4 is conducted. When the second port L is electrically connected with the third port M, a path between LB DRX and the first combiner 3 or the first antenna 5 electrically connected with the first combiner 3 is conducted. In addition, conduction of the first control switch 1 in FIG. 2 is similar to that in FIG. 1, which will not be repeated again.

In other words, switching among a first port K, a second port L, a third port M, and a fourth port N is performed through the first control switch 1, so that switching between two antennas in a low frequency band may be implemented.

Alternatively, the two second input terminals are respectively electrically connected with a third terminal and a fourth terminal in one-to-one correspondence, and the two first target input terminals are respectively electrically connected with a fifth terminal and a sixth terminal in one-to-one correspondence.

The third terminal is a common terminal for primary receiving and transmitting of one of the second radio frequency paths, and the fourth terminal is a diversity receiving terminal of one of the second radio frequency paths. The fifth terminal is a diversity receiving terminal of one of the second radio frequency paths, and the sixth terminal is a diversity receiving terminal of one of the second radio frequency paths. The third terminal, the fourth terminal, the fifth terminal, and the sixth terminal are terminals of different second radio frequency paths respectively.

Alternatively, because the second radio frequency path may operate in a MHB, two terminals electrically connected with a second control switch 201 may be a common terminal for primary receiving and transmitting in a medium-high band (MHB TRX) and a third multiple-input multiple-output terminal (MIMO3) (i.e. a diversity receiving terminal). Two terminals electrically connected with a third control switch 202 may be a diversity receiving terminal in a medium-high band (MHB DRX) and a second multi-input multi-output terminal (MIMO2) (that is, a diversity receiving terminal).

In addition, for example, as shown in FIG. 1, a fifth port A and a sixth port B form two second input terminals of the second control switch 201, a seventh port C and an eighth port D form two second output terminals of the second control switch 201, a ninth port E, a tenth port F, and an eleventh port G form three third input terminals of the third control switch 202, and a twelfth port H, a thirteenth port I, and a fourteenth port J form three third output terminals of the third control switch 202. For example, conduction of one of the second control terminal 201 and the third control terminal 202 is used as an example.

When the fifth port A is electrically connected with the eighth port D, a path between MHB TRX and a second antenna 5 is conducted. When the sixth port B is electrically connected with the seventh port C, and the ninth port E is electrically connected with the fourteenth port J, a path between MIMO3 and a second antenna 5 is conducted. When the tenth port F is electrically connected with the thirteenth port I, a path between MHB DRX and a second antenna 5 is conducted. When the eleventh port G is electrically connected with the twelfth port H, a path between MIMO2 and the first combiner 3 or the first antenna 5 electrically connected with the first combiner 3 is conducted.

Certainly, it can be understood that other conductions for the second control switch 201 and the third control switch 202 are not listed herein. Similarly, conduction of the second control switch 201 and the third control switch 202 in FIG. 2 is similar to the principle in FIG. 1, which will not be repeated herein again.

In addition, DPDT (i.e. the second control switch 201 in FIG. 1 and FIG. 2) needs to be added to a MHB TRX path and MIMO3 path. Due to a long radio frequency path and a via hole, a great path insertion loss will be caused, which will affect the conduction performance. Therefore, to reduce the insertion loss, the DPDT switch and a radio frequency front-end device may be combined to reduce the complexity of wiring. For example, if a QM77038 power amplifier is used to replace the second control switch 201 in FIG. 2, an insertion loss caused by using this architecture may be effectively reduced.

To sum up, through the antenna switching circuit according to the embodiments of the present disclosure, the radio frequency path in a LB is separated from the radio frequency path in a MHB, that is, the radio frequency path in a LB and the radio frequency path in a MHB are not combined at the front end, thus reducing a loss of a combiner for antenna combination. Moreover, two-antenna switching may be used in the LB situation, while four-antenna switching may be used in the MHB situation.

An embodiment of the present disclosure further provides a terminal, including the antenna switching circuit.

The antenna switching circuit splits a path between a first antenna and a first radio frequency path operating in a first frequency band from a path between a second antenna and a second radio frequency path operating in a second frequency band, so that the first radio frequency path operating in the first frequency band and the second radio frequency path operating in the second frequency band will not be combined at a front end, thus reducing an insertion loss caused by a combiner. Furthermore, splitting of a path between the first radio frequency path operating in a frequency band and an antenna from a path between the second radio frequency path operating in a different frequency band and an antenna helps to simplify lines of the antenna switching circuit. Therefore, the terminal according to this embodiment of the present disclosure can operate by using the antenna switching circuit with a smaller insertion loss, improving the communication performance of the terminal.

The foregoing descriptions are merely the optional implementations of the present disclosure. It should be noted that those of ordinary skill in the art may further make several improvements and refinements without departing from the principles described in the present disclosure, and these improvements and refinements also fall within the protection scope of the present disclosure.

What is claimed is:

1. An antenna switching circuit, comprising:
a first switching circuit, wherein the first switching circuit is electrically connected with at least two first radio frequency paths and at least two first antennas, respectively, and the first switching circuit comprises at least one first state, in a first state, one of the first radio frequency paths is connected with one of the first antennas, and an operating band of the first radio frequency path is a first frequency band; and
a second switching circuit, wherein the second switching circuit is electrically connected with at least two second radio frequency paths and at least two second antennas, respectively, and the second switching circuit comprises at least one second state, in a second state, one of the second radio frequency paths is connected with one of the second antennas, and an operating band of the second radio frequency band is a second frequency band; wherein
the first frequency band is lower than the second frequency band; and
a first combiner, comprising a fourth input terminal, a fifth input terminal, and a fourth output terminal, wherein the fourth input terminal is electrically connected with the first switching circuit, the fourth output terminal is electrically connected with a first target antenna, the first target antenna is one of the at least two first antennas, and the fifth input terminal is electrically connected with the second switching circuit; and the first combiner is used to combine one first radio frequency path of the at least two first radio frequency paths and one second radio frequency path of the at least two second radio frequency paths; and
the second switching circuit further comprising a third state, wherein in the third state, one of the at least two second radio frequency paths is connected with the first target antenna.

2. The antenna switching circuit according to claim 1, wherein the first switching circuit comprises:
a first control switch, comprising two first input terminals, two first output terminals, and a first connection switch, wherein the first connection switch can switch a connection state between any of the first input terminals and any of the first output terminals, the two first input terminals are respectively electrically connected with two of the first radio frequency paths in one-to-one correspondence, and the two first output terminals are respectively electrically connected with two of the first antennas in one-to-one correspondence.

3. The antenna switching circuit according to claim 2, wherein the two first input terminals are electrically connected with a first terminal and a second terminal, respectively, wherein the first terminal is a transceiver of one of the first radio frequency paths, and the second terminal is a discontinuous reception of one of the first radio frequency paths.

4. The antenna switching circuit according to claim 1, wherein the second switching circuit comprises:
a second control switch, comprising two second input terminals, two second output terminals, and a second connection switch, wherein the second connection switch can switch a connection state between any of the second input terminals and any of the second output terminals; and
a third control switch, comprising three third input terminals, three third output terminals, and a third connection switch, wherein the third connection switch can switch a connection state between any of the third input terminals and any of the third output terminals, wherein
the two second input terminals and two first target input terminals are respectively electrically connected with four of the second radio frequency paths in one-to-one correspondence, one first target output terminal and the three third output terminals are electrically connected with four of the second antennas in one-to-one correspondence, and a second target output terminal is electrically connected with a second target input terminal;
the second target input terminal is one of the three third input terminals, and the first target input terminal is one of the three third input terminals except the second target input terminal; and
the first target output terminal is one of the two second output terminals, and the second target output terminal is the other of the two second output terminals.

5. The antenna switching circuit according to claim 4, wherein the two second input terminals are respectively electrically connected with a third terminal and a fourth terminal in one-to-one correspondence, and the two first target input terminals are respectively electrically connected with a fifth terminal and a sixth terminal in one-to-one correspondence, wherein
the third terminal is a transceiver of one of the second radio frequency paths, and the fourth terminal is a diversity receiving terminal of one of the second radio frequency paths, the fifth terminal is a diversity receiving terminal of one of the second radio frequency paths, and the sixth terminal is a discontinuous reception of one of the second radio frequency paths.

6. The antenna switching circuit according to claim 1, wherein operating frequency points of any two of the at least two first radio frequency paths are different, and operating frequency points of any two of the at least two second radio frequency paths are different.

7. A terminal, comprising an antenna switching circuit, wherein the antenna switching circuit comprises:
a first switching circuit, wherein the first switching circuit is electrically connected with at least two first radio frequency paths and at least two first antennas, respectively, and the first switching circuit comprises at least one first state, in a first state, one of the first radio frequency paths is connected with one of the first antennas, and an operating band of the first radio frequency path is a first frequency band; and
a second switching circuit, wherein the second switching circuit is electrically connected with at least two second radio frequency paths and at least two second antennas, respectively, and the second switching circuit comprises at least one second state, in a second state, one of the second radio frequency paths is connected with one of the second antennas, and an operating band of the second radio frequency band is a second frequency band; wherein the first frequency band is lower than the second frequency band; and a first combiner, comprising a fourth input terminal, a fifth input terminal, and a fourth output terminal, wherein the fourth input terminal is electrically connected with the first switching circuit, the fourth output terminal is electrically connected with a first target antenna, the first target antenna is one of the at least two first antennas, and the fifth input terminal is electrically connected with the second switching circuit; and the first combiner is used to combine one first radio frequency path of the at least two first radio frequency paths and one second radio frequency path of the at least two second radio frequency paths; and the second switching circuit further comprising a third state, wherein in the third state, one of the at least two second radio frequency paths is connected with the first target antenna.

8. The terminal according to claim 7, wherein the first switching circuit comprises:

a first control switch, comprising two first input terminals, two first output terminals, and a first connection switch, wherein the first connection switch can switch a connection state between any of the first input terminals and any of the first output terminals, the two first input terminals are respectively electrically connected with two of the first radio frequency paths in one-to-one correspondence, and the two first output terminals are respectively electrically connected with two of the first antennas in one-to-one correspondence.

9. The terminal according to claim 8, wherein the two first input terminals are electrically connected with a first terminal and a second terminal, respectively, wherein the first terminal is a transceiver of one of the first radio frequency paths, and the second terminal is a discontinuous reception of one of the first radio frequency paths.

10. The terminal according to claim 7, wherein the second switching circuit comprises:

a second control switch, comprising two second input terminals, two second output terminals, and a second connection switch, wherein the second connection switch can switch a connection state between any of the second input terminals and any of the second output terminals; and a third control switch, comprising three third input terminals, three third output terminals, and a third connection switch, wherein the third connection switch can switch a connection state between any of the third input terminals and any of the third output terminals, wherein the two second input terminals and two first target input terminals are respectively electrically connected with four of the second radio frequency paths in one-to-one correspondence, one first target output terminal and the three third output terminals are electrically connected with four of the second antennas in one-to-one correspondence, and a second target output terminal is electrically connected with a second target input terminal;

the second target input terminal is one of the three third input terminals, and the first target input terminal is one of the three third input terminals except the second target input terminal; and the first target output terminal is one of the two second output terminals, and the second target output terminal is the other of the two second output terminals.

11. The terminal according to claim 10, wherein the two second input terminals are respectively electrically connected with a third terminal and a fourth terminal in one-to-one correspondence, and the two first target input terminals are respectively electrically connected with a fifth terminal and a sixth terminal in one-to-one correspondence, wherein the third terminal is a transceiver of one of the second radio frequency paths, and the fourth terminal is a diversity receiving terminal of one of the second radio frequency paths, the fifth terminal is a diversity receiving terminal of one of the second radio frequency paths, and the sixth terminal is a discontinuous reception of one of the second radio frequency paths.

12. The terminal according to claim 7, wherein operating frequency points of any two of the at least two first radio frequency paths are different, and operating frequency points of any two of the at least two second radio frequency paths are different.

\* \* \* \* \*